(12) United States Patent
Gehrke et al.

(10) Patent No.: US 10,503,137 B2
(45) Date of Patent: Dec. 10, 2019

(54) SAFETY MODULE FOR AN AUTOMATION SYSTEM, METHOD FOR OPERATING A SAFETY MODULE IN AN AUTOMATION SYSTEM AND AUTOMATION SYSTEM

(71) Applicant: FESTO AG & Co. KG, Esslingen (DE)

(72) Inventors: Martin Gehrke, Weinstadt (DE); Martin Maier, Ostfildern (DE); Roland Kalberer, Kirchheim (DE); Andreas Herzog, Weinstadt (DE); Ralf Forcht, Wendlingen (DE)

(73) Assignee: FESTO AG & CO. KG, Esslingen (DE)

( * ) Notice: Subject to any disclaimer, the term of this patent is extended or adjusted under 35 U.S.C. 154(b) by 150 days.

(21) Appl. No.: 15/805,580

(22) Filed: Nov. 7, 2017

(65) Prior Publication Data
US 2018/0143604 A1    May 24, 2018

(30) Foreign Application Priority Data
Nov. 21, 2016  (DE) .................. 10 2016 222 938

(51) Int. Cl.
*G05B 19/042*    (2006.01)
(52) U.S. Cl.
CPC ............ *G05B 19/0428* (2013.01); *G05B 2219/24024* (2013.01)
(58) Field of Classification Search
CPC ............ G05B 19/0428; G05B 2219/24024
See application file for complete search history.

(56) References Cited

U.S. PATENT DOCUMENTS

| | | | |
|---|---|---|---|
| 2011/0153040 A1* | 6/2011 | Wittmer | G05B 19/4185 700/79 |
| 2011/0191062 A1* | 8/2011 | Grittke | G05B 9/02 702/182 |
| 2018/0276169 A1* | 9/2018 | Hansing | H04L 12/40078 |

FOREIGN PATENT DOCUMENTS

DE    102013003166    8/2014

* cited by examiner

*Primary Examiner* — Glenn A. Auve
(74) *Attorney, Agent, or Firm* — Hoffmann & Baron, LLP

(57) ABSTRACT

A safety module for an automation system including a communication interface, which is configured for a signal-transmitting connection to a communication system including an output interface, which is configured for a signal-transmitting connection to consumers, which can be attached downstream, and including a processing device which is connected to both interfaces and is configured for processing communication signals from the communication interface and for providing processing results as output signals at the output interface. The processing device is configured such that a safety-related output signal is provided at the output interface if a safety signal, which is contained in a communication signal, is present, and if at least two data records, which are respectively provided in a communication signal, are encoded differently and are directed at the processing device, conform with one another.

11 Claims, 3 Drawing Sheets

SAFETY MODULE FOR AN AUTOMATION SYSTEM, METHOD FOR OPERATING A SAFETY MODULE IN AN AUTOMATION SYSTEM AND AUTOMATION SYSTEM

BACKGROUND OF THE INVENTION

The invention relates to a safety module for an automation system, comprising a communication interface which is configured for a signal-transmitting connection to a communication system, comprising an output interface which is configured for an electrical, in particular a signal-transmitting connection to consumers which can be attached downstream, and comprising a processing device which is connected to both interfaces and is configured for processing communication signals from the communication interface and for providing processing results as output signals at the output interface. The invention also relates to a method for operating a safety module in an automation system and to an automation system.

A safety module referenced as CPX-FVDA-P which is configured for communication with a superordinated, safety-related control system and for a safety-related influence on consumers which can be attached downstream is distributed by the Applicant. In this respect, it is to be assumed that in line with current safety standards, knowledge by the safety module of the consumers which can be attached downstream is required, information concerning this being input directly into the safety module by a suitable input device, for example.

SUMMARY OF THE INVENTION

The object of the invention is to provide a safety module, a method for operating a safety module in an automation system, and an automation system, which allow a simplified safety-related administration.

This object is achieved for a safety module comprising a communication interface which is configured for a signal-transmitting connection to a communication system, comprising an output interface which is configured for an electrical connection to consumers which can be attached downstream, and comprising a processing device which is connected to both interfaces and is configured for processing communication signals from the communication interface and for providing processing results as output signals at the output interface, wherein the processing device is configured such that a safety-related output signal is provided at the output interface during the presence of a safety signal which is contained in a communication signal, and it is provided when there is a conformity of at least two data records which are each provided in a communication signal, are encoded differently and are directed at the processing device.

If the communication interface and the output interface are respectively bus communication interfaces, it can be provided that the communication system, connected to the communication interface, and the downstream attachable consumers which are connected to the output interface exchange information with the same bus protocol.

By way of example, it is provided in this case that at least one of the bus communication systems has at least two communication portions which operate with different bus protocols. In particular, it can be provided that the communication system comprises an external bus communication system for communication between a superordinated control and a bus node as well as an internal bus communication system for communication between the bus node and the safety module.

Alternatively, it can be provided that an exchange of information is provided at the communication interface according to a first communication protocol, which can be in particular a bus communication protocol. It can also be provided that either electrical power for the direct operation of the downstream attachable consumers, or control signals for controlling the downstream attachable consumers is provided at the output interface. In the following, the term output signal will be used for both cases. By way of example, it is provided that the output interface comprises a plurality of output connections which are configured for an individual electrical coupling to the downstream attachable consumers; in this case, the output interface can also be called a multipole interface.

The processing device of the safety module can be configured, for example, as a microprocessor or microcontroller on which a presettable program runs which allows the processing of communication signals provided at the communication interface, and also allows the provision of output signals at the output interface. Here, the processing device with the program running thereon is configured to provide a safety-related output signal only under clearly defined conditions, in particular if the safety-related output signal is a signal which is to initiate the release of an energy supply for an actuator. For this purpose, the safety module can be connected to one or more downstream attachable consumers, and these consumers can either be electrical consumers, such as solenoids for magnetic valves or electric drives, or alternatively actuator control systems which, for their part, are configured to release electric and/or pneumatic and/or hydraulic energy to associated actuators. It is preferably provided that at least one of these consumers has presettable reliability characteristics according to a presettable safety category, for example it allows a redundant influencing, in particular disconnection of an energy flow, in particular a flow of compressed air to the respectively associated actuator.

A safety-related output signal of this type should only be provided at the output interface to maintain a safety level within a predetermined safety category if a safety signal of a superordinated control, which signal is contained in a communication signal transmitted by the communication system, has arrived in the processing device. The communication signal must be directed specifically at the safety module, this is checked, for example, by comparing an addressing associated with the communication signal with an internal, in particular presettable addressing of the safety module, and only if the addressings match, the communication signal will be further processed in the safety module.

Furthermore, it must be ensured for the provision of the safety-related output signal at the output interface that the safety module and the components attached thereto have been configured correctly in the superordinated control, i.e. that a correct arrangement of the connected components is stored in the superordinated control. This is checked in the processing device in that data records from one or more of the differently encoded communication signals are compared with each other in the processing device of the safety module and the safety-related output signal is only released if the two data records match each other. This check is preferably carried out during a start phase of the safety module, during which a control of output signals is not provided anyway. The result of the check is then stored in the safety module and fed back, if appropriate, to the superordinated control. In contrast thereto, output signals are output during normal operation of the safety module if the aforementioned conditions have been met.

The different encoding of the data records preferably stems from the fact that the contents of the respective data records are generated differently. In this respect, the two data records can have an identical or different sequence of information, in particular of characters. It is crucial that in spite of the data records being generated/input in a non-safety-related configuration system and via a connection between the superordinated control, set up with the configuration system, and the safety module, they are used in the safety module to be checked against each other based on their different encoding, and only a positive result of the check allows output signals to be output by the safety module during normal operation of the safety module.

A first data record can be generated, for example, using a configuration system of the superordinated control which in particular comprises a safety-related control. This configuration system, which is also called an engineering system, is configured as a man-machine interface and can comprise in particular a graphic user interface on which specifications and parameters for the superordinated control and the connected components are set out. For example, it can be provided that a first data record is generated in an automated manner in the configuration system in that, using the configuration system, a user inputs information which describes the safety module and the consumers/components attached thereto, in particular safety-related actuator controls. Thereafter, this input information is converted in the configuration system in an automated manner and without further intervention by the user, into a corresponding data record which is encoded in a first way and can be transmitted to the safety module in a communication signal. This data record can also be called a configuration data record.

A second data record which can be contained, for example, in the first data record, in particular as a parameterisation is, for example, generated manually by the user without the interconnection of automatic processes, in particular software programs, using a list. This list contains, for example, short identifiers for components which may be connected to the safety module. From this list, the user selects the identifiers for the consumers/components which are actually connected to the safety module and produces therefrom the second data record, particularly in a sequence of a list of the components on the safety module. This manually generated, second data record can then also be input into the configuration system, preferably as parameters for one of the components, in particular for the safety module and encoded in a second way by the superordinated control in a communication signal, in particular transmitted to the safety module.

In this manner, it is possible to ensure a so-called diversitary redundant provision of data records in respect of compiling and arranging the consumers/components attached downstream on the safety module, thereby maintaining a presettable safety level within a presettable safety standard.

Advantageous developments of the invention are the subject of the subclaims.

It is expedient if the processing device is configured such that the provision of the at least one safety-related output signal at the output interface requires a decoding of a first set of parameters from a first data record, a decoding of a second set of parameters from a second data record and also a conformity between the two sets of parameters. For example, the sets of parameters state which components, in particular which safety-related actuator controls, are strung together with the safety module.

A further embodiment of the invention provides that the processing device is configured such that the provision of the safety-related output signal at the output interface requires a conformity of the first and second sets of parameters with component parameters which are stored in a memory device of the processing device. Particularly in the case of a bus communication with the downstream attachable consumers, this is used for an additional plausibility check for the parameters, provided with the first and second set of parameters by the superordinated control, with the component parameters stored in the safety module. Due to the check whether the data records contain only those parameters which are also stored in the safety module and thus also correspond to components which can actually be connected to the output interface, configured in particular as a bus communication interface, of the safety module, an increase in the safety level for controlling the consumers by the superordinated control is ensured.

It is preferably provided that the processing device is configured such that the provision of the at least one safety-related output signal at the output interface requires a decoding of address information from the first and/or second data record as well as a conformity of this address information with address information of an addressing means, associated with the processing device, in particular before the comparison of the differently encoded data records which are directed at the processing device is carried out. This measure prevents a safety module from a group of safety modules being incorrectly addressed and from performing the provided comparison of the differently encoded data records which are directed at the processing device of the safety module which, upon conformity of the data records, could possibly lead to an unintended provision of a safety-related output signal at the output interface. Instead, the safety-related output signal is only provided on the condition that one or both of the data records contains address information which is identical to address information which is imprinted, in particular stored or manually preset or electronically preset, on the safety module, and only a correct comparison of the items of address information allows, in a downstream step, the comparison of the differently encoded data records which are directed at the processing device. For example, it can be provided that the address information of the safety module is encoded in a permanently programmed or variably settable addressing means. A variable addressing means can be configured, for example, as a DIP switch arrangement in which the address information of the safety module is represented by different switch positions. It can also be provided that the address information is a safety address of a bus communication protocol used for communication between the superordinated control and the safety module, or is at least part of this safety address. Alternatively, the address information can be individually tailored to the respective safety module, irrespective of a possible safety address.

The object of the invention is achieved by a method for operating a safety module in an automation system. This method comprises the following steps: transferring a first data record written according to a first encoding, from a superordinated control to a safety module, transferring a second data record written according to a second encoding, from the superordinated control to the safety module, decoding and comparing the two data records in a processing device of the safety module, transferring a safety signal from the superordinated control and/or from a safety control associated with the superordinated control to the safety module, checking the address information contained in the first or second data record against address information imprinted on the safety module and processing the safety signal in the processing device into at least one safety-related output signal, a provision of the at least one safety-related output signal from the safety module to an output interface, to which at least one consumer, connected to the safety module, is attached, being carried out on the condition that the address information contained in one of the two data records conforms with address information imprinted on the safety module and with the two data records. By way of example it is provided that associated with the superordinated control is a safety control which is in communicating connection with the superordinated control. For a communication of the safety control with components connected to the communication system of the superordinated control, it can be provided that the safety control provides corresponding signals at the superordinated control which are forwarded from there via the communication system to the connected components, in particular also to the safety module. It can be provided for the transfer of the two data records that the second data record forms part of the first data record, for example in that the second data record is contained as parameters inside the first data record which represents a configuration of the components connected to the safety module. In this case, the different encoding of the two data records can already be inside a data telegram in their different arrangement. Additionally or alternatively, it can be provided that the items of information to be transferred with the two data records are formed in different character sets and/or with different encoding conventions and are provided at the safety module inside the same data telegram or inside different data telegrams.

A further modification of the method provides that the processing device provides the safety-related output signal at the output interface if the first and second data records are consistent with component parameters which are stored in a memory device of the processing device. This is particularly significant in the case of an optionally provided bus communication with downstream attachable consumers.

A further modification of the method provides that the processing device provides the safety-related output signal at the output interface if address information from the first and/or second data record has been decoded in the processing device and if this address information conforms with address information of an addressing means associated with the processing device.

For example, it is provided that the procedure of comparing the address information is carried out, in particular once only, during a start phase for the safety module and that, if there is a positive comparison between the items of address information, release information is stored in the processing device. During normal operation of the safety module, this release information is then requested before a safety-related output signal is forwarded to the output interface, the safety-related output signal only being provided at the output interface if the release signal is actually present.

A further modification of the method provides that the processing device provides the safety-related output signal at at least one group of consumers/components which are connected to the output interface if the first data record and the second data record contain in a conforming manner at least one group of parameters which determines at least one zonal border for the group, and if the safety signal of the superordinated control is directed at the at least one group of components. The at least one zonal border for the group of components can be configured as a real or virtual component. It is used to determine a group of consumers/components which is controlled uniformly by the safety control, for example in order to be able to set a sub-function within a complex installation into a secure state if a safety request is received, while other sub-functions of the complex installation should not be affected by this safety request. It is preferably provided that the zonal border is configured virtually, i.e. it determines a border between adjacent groups of consumers/components without the presence of a physical component, so that for example consumers/components which are arranged upstream of the zonal border can be controlled in a different manner by the safety control compared to consumers/components which are arranged downstream of the respective zonal border, and a real separating module between the two groups is not required for this purpose. The zonal border is determined for a real or virtual component by the group of parameters which must be contained in a conforming manner in the two data records, particularly in the same position within the respective data records. A control of this type of consumers/components within the respective zonal borders is particularly advantageous, because with a suitable configuration of the safety module, if the arrangement and/or number of consumers/components within the respective zone is changed, the programming in the safety control does not have to be changed. Consequently, it is possible to minimise the configuration expense for the safety control.

Thus, due to this measure, the superordinated control, in particular the superordinated safety control can control groups of components in a safety-related manner, without a detailed knowledge being required of the composition of the respective group in the superordinated control, in particular of the safety-related control. Instead, it suffices if there is provided in the two data records, particularly in the sets of parameters, a respective conforming group of parameters, via which the superordinated control can address the respective group, and if this also takes place by the provision of the safety signal from the superordinated control to the safety module.

The object of the invention is achieved for an automation system for the safety-related control of at least one safety module. Here, the automation system comprises a superordinated control which has an interface of a communication system to which at least one subordinated control is connected, the subordinated control comprising a safety module as well as a plurality of consumers connected to the safety module and a plurality of consumers connected to the safety module via an output interface, and also with a safety control which is associated with the superordinated control and is configured to provide a safety signal at the safety module via the superordinated control, the safety module being configured according to the invention and/or being configured to implement the method according to the invention. In this respect, the safety control can be configured as a separate component or as an integral component of the superordinated control.

BRIEF DESCRIPTION OF THE DRAWINGS

The drawings show an advantageous embodiment of the invention.

DETAILED DESCRIPTION

Figure 1:
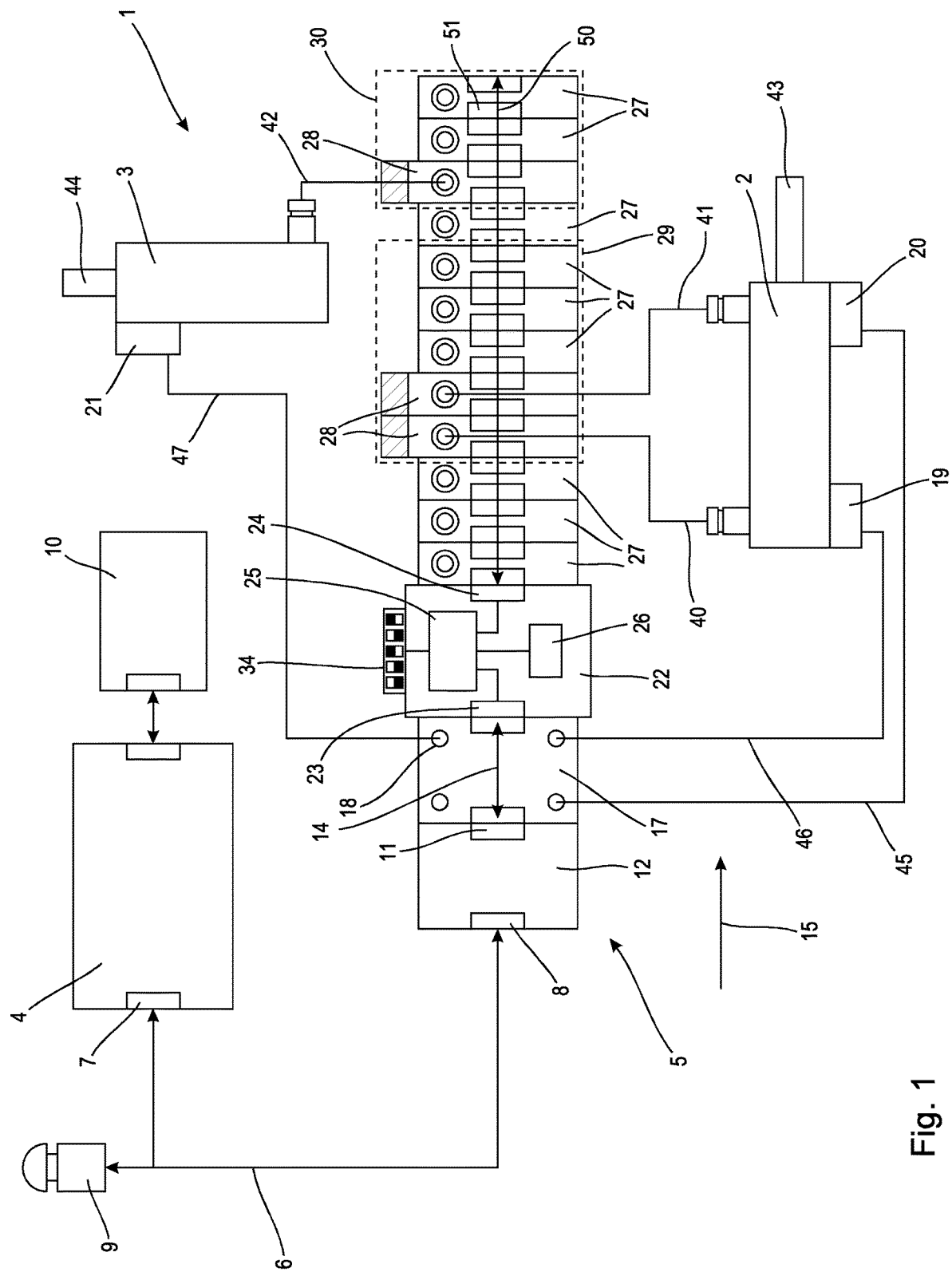
FIG. 1 schematically shows an automation system for the safety-related control of at least one safety module, FIG. 2 schematically shows a representation of part of the automation system according to FIG. 1 on a user interface of an input device, FIG. 3 schematically shows a representation of the safety module on the input interface.

An automation system 1 shown schematically in FIG. 1 serves to operate a plurality of actuators 2, 3 which are configured purely by way of example as pneumatic cylinders with piston rods 43, 44, the movements of which can possibly cause hazards, particularly to an operator (not shown). For this reason, the automation system 1 is fitted with at least one safety-related component, described in detail in the following, for a safety-related operation.

Purely by way of example, it is assumed that the automation system 1 comprises a superordinated control 4 which is configured as a memory-programmable control (SPS) and is configured for communication with and for influencing a plurality of bus users, in particular a subordinated control 5 and components which are connected thereto and will be described in detail in the following, whereby the components can also be called consumers. For communication between the superordinated control 4 and the subordinated control 5, an external bus system 6 is provided purely by way of example which is connected to the superordinated control 4 by an interface 7 and is connected to the subordinated control 5 by an interface 8. Furthermore, arranged purely by way of example on the external bus system 6, in addition to the subordinated control 5, also called a bus user, is a push-button 9 as a further bus user which can initiate an emergency stop of the actuators 2, 3, operated by the automation system 1, with the interconnection of the subordinated control 5.

To ensure a safety-related disconnection of the actuators 2, 3 when the push-button 9 is actuated, a safety control 10 is associated with the superordinated control 4, which safety control ensures a safety-related communication with the push-button 9 and a safety-related communication with the subordinated control 5 via the external bus system 6 and the interconnected superordinated control 4. The procedures provided here in the safety control 10, in the superordinated control 4 and in the subordinated control 5 will be described in detail below.

Purely by way of example, the subordinated control 5 is constructed modularly from a plurality of components, communication taking place at least between some of the components by means of an internal communication system 14, configured in particular as a proprietary bus system. Other components are, for example, supplied directly with electrical power, which takes place via a multipole connection, provided purely by way of example, i.e. via a parallel arrangement of a plurality of electrical conductors which can be charged individually with electrical energy. The components have in each case mutually associated interfaces for communication by means of the internal communication system 14. For coupling the internal communication system 14 to the external bus system 6 which is provided by the superordinated control 4, the subordinated control 5 comprises the bus node 12 which is configured for a bidirectional conversion of bus signals between the external bus system 6, connected to a bus interface 8, and the internal bus system 14 of the subordinated control 5.

Connected purely by way of example to the bus node 12 in the alignment direction 15 which, purely by way of example, extends to the right according to the view of FIG. 1, is an input module 17 which is provided with a plurality of inputs 18 which are configured, for example, for connecting sensor lines 45, 46, 47 of sensors 19, 20, 21. The input module 17 is configured for detecting and pre-processing sensor signals from the sensors 19 to 21. The sensor signals which have been pre-processed by the input module 17 can be provided, for example, via the internal communication system 14 at the bus node 12 and can be sent from there via the external bus system 6 to the superordinated control 4 for further processing, in particular for signal evaluation.

Connected to the input module 17 is a safety module 22 which comprises a communication interface 23, an output interface 24, a processing device 25 and a memory device 26. Purely by way of example, the communication interface 23 is configured for communication with the bus node 12 according to the internal bus communication protocol. It is also provided, purely by way of example, that the safety module 22 cannot directly access sensor signals which are connected to the input module 17. In an embodiment (not shown) of the input module and of the safety module, a direct communication of this type between the input module and the safety module is provided by means of the internal communication system.

The processing device 25 is preferably configured as a microprocessor and is intended to run a presettable program, in particular a software. This program can be stored in the memory device 26 particularly during production or configuration of the safety module 22, and from there, can be read out by the processing device 25 to operate the safety module 22.

Purely by way of example, connected to the safety module 22 is a plurality of general valves 27, and also purely by way of example, connected to the safety module is a plurality of fail-safe valves 28 which are respectively configured to provide a flow of fluid to a respectively associated fluid consumer. By way of example, the output interface of the safety module 22 is provided as a multipole interface for connection to a plurality of individual electrical conductors which have been combined into a multipole line 50. The subsequently arranged consumers loop through the multipole line 50 in a manner not described in more detail. For this purpose, each of the consumers has mutually coordinated multipole plug connectors 51 on mutually opposite outer surfaces. It is provided by way of example that the safety module 22 has a plurality (not shown) of electronic or electromechanical switches which are configured to individually provide electrical energy to the respective conductor of the multipole line 50. More preferably, it is provided that a series connection of two switches is allocated to at least one conductor of the multipole line 50 inside the safety module 22, to be able to ensure a functionally reliable disconnection of the associated conductor of the multipole line.

For reasons of clarity, only the fail-safe valves 28 are respectively connected to associated fluid consumers, namely actuators 2 and 3 via associated fluid lines 40, 41, 42. The general valves 27, on which lower demands are made in terms of functional reliability than on the fail-safe valves 28 are configured, for example as magnetic valves or piezo valves and are directly connected or disconnected by the provision or disconnection of electrical energy by the safety module 22 via the multipole line 50, connected to the output interface 24, or are operated as proportional valves in freely selectable intermediate positions.

The fail-safe valves 28 are also configured for control via the multipole line 50. Furthermore, the safety-related valves 28 are configured both in an electrical respect and in a fluidic respect according to the requirements of a safety category required for the automation system 1. It is provided by way of example that each of the fail-safe valves 28 comprises an internal series connection of two monostable magnetic valves (not shown), so that a flow of fluid can be released through the respective fail-safe valve 28 only when both internal magnetic valves release the associated fluid channel at the same time. The fail-safe valves 28 can also comprise further electrical or electronic measures which, for example, enable a state detection for the switching state of the respective internal magnetic valves in order to be able to provide an error message at the safety module 22, if appropriate.

It is provided by way of example that the when the push-button 9 is actuated, the safety module 22 receives a safety signal from the safety control 10. This safety signal is provided at the internal communication system 14 of the subordinated control 5 via the superordinated control and the external bus system 6. This safety signal is to cause an influencing, in particular a disconnection of an energy flow, in particular a fluid flow for the actuators 2 and/or 3. It can also be provided that in this case, the safety module 22 is also configured for influencing non-safety-related valves 27, to which for example actuators (not shown) are connected which are in an operative connection (also not shown) with the actuators 2 and 3 and, if the automation system is disconnected in a safety-related manner, are also to perform supporting, but not safety-critical tasks.

It is particularly advantageous if the general valves 27 which are connected to the safety module 22 and are also called consumers, and fail-safe valves 28 can be combined into zones, the safety control 10 only influencing the respective zones, without requiring more detailed information about which consumers are provided within the respective zone.

Figure 2:
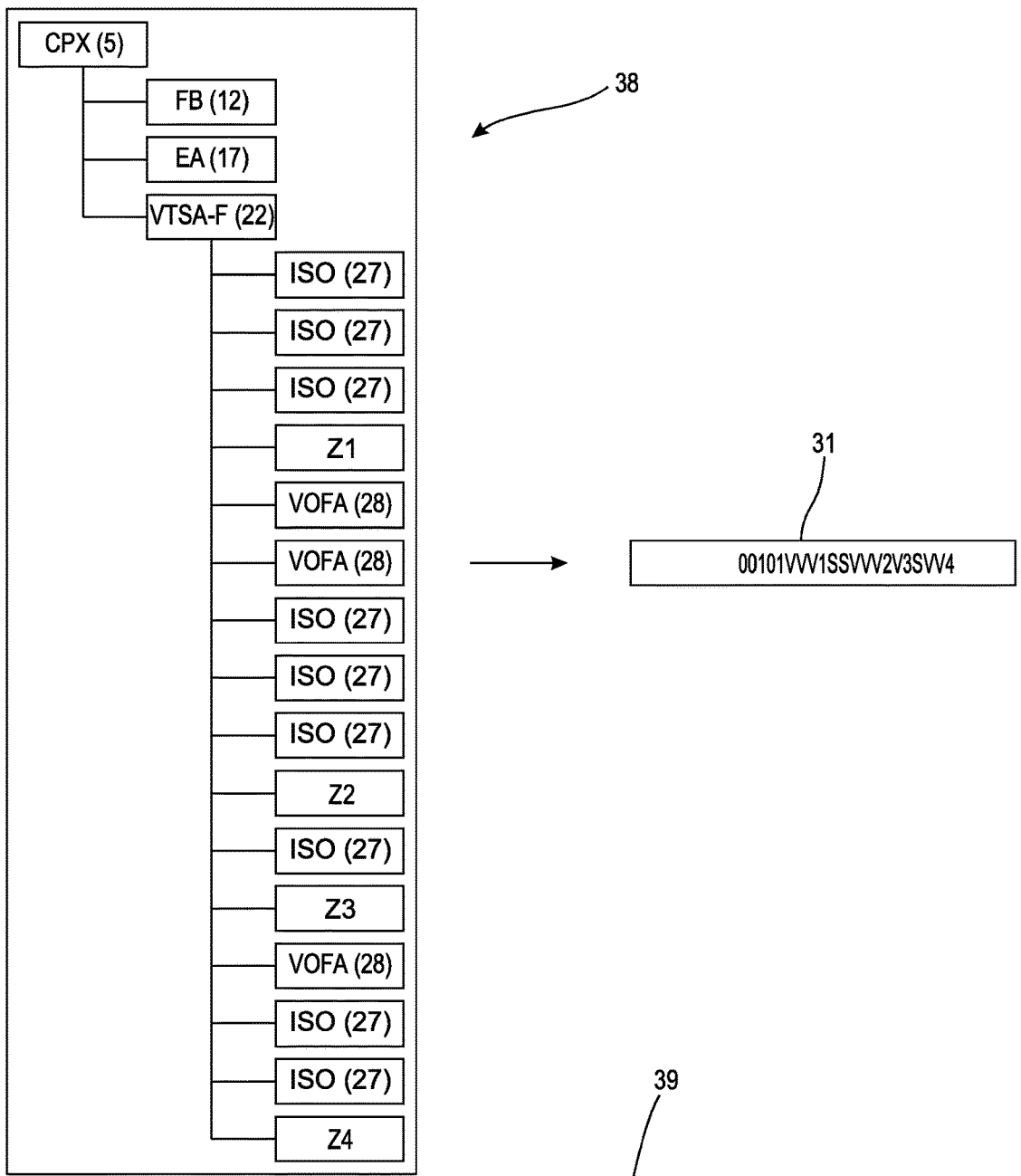

The schematic drawing of FIG. 2 shows how the individual components of the subordinated control 5 can be represented on a graphic user interface of a configuration system, also called an engineering system, of the superordinated control 4, which configuration system can run, for example, on a programming device (not shown) for the superordinated control, in particular on a personal computer. In this respect, chosen for the representation of the components is a tree structure 38 in which the subordinated control 5 is arranged, purely by way of example, at the top on the left under "CPX", and the components linked thereto, such as the bus node 12, the input module 17 and the safety module 22 are arranged shifted below to the right. It can also be seen in FIG. 2 that all the components, added to the safety module 22, namely the valves 27 and the safety-related valves 28 are also represented on the graphic user interface of the configuration system, the general valves 27 being denoted by "ISO" and the fail-safe valves 28 being denoted by "VOFA".

Furthermore, entered into the graphic representation of the subordinated control 5 are also zonal borders Z1 to Z4 which, purely by way of example, delimit four zones within the subordinated control 5. In this respect, for reasons of clarity, only zones 29 and 30 with the zonal borders Z2 and Z4 find their equivalent in FIG. 1. In this respect, zone 29 which starts after zonal border Z1 and ends with zonal border Z2 comprises by way of example according to FIG. 1 the two fail-safe valves 28 which are directly strung together as well as three further general valves 27. Zone 30 which starts after zonal border Z3 and ends with zonal border Z4 comprises by way of example a fail-safe valve 28 and two general valves 27 which are strung together.

The graphic user interface of the configuration system is configured to produce from a user's input the representation of the components of the subordinated control 5 according to FIG. 2, which is also called a configuration. The configuration is provided at the subordinated control 5 during a start phase for the automation system 1 via the bus system 6 and is further processed in the safety module 22 so that said safety module receives the necessary information about the connected components/consumers and the allocation of the consumers to zones Z1 to Z4. In particular, the safety module 22 is configured such that it can generate from the provided configuration of the connected consumers/components a character string with identifiers which is used to identify the individual consumers and it can temporarily store this character string in the memory device 26 for further processing in the processing device 25.

Figure 3:
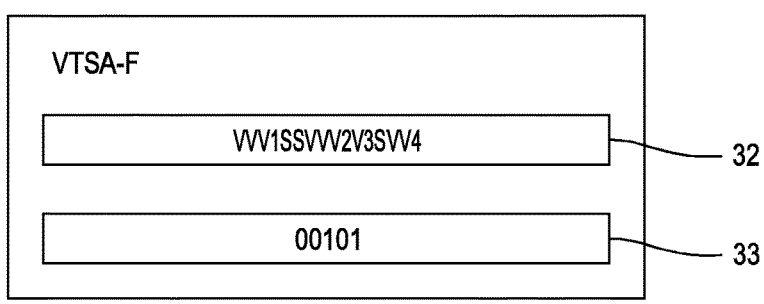

Furthermore, the graphic user interface of the configuration system has an input mask which is shown schematically in FIG. 3. This allows the allocation of additional characteristics, in particular parameters, to individual consumers/components of the subordinated control 5.

FIG. 3 schematically shows, purely by way of example, a tab which is tailored individually to the safety module 22 and can be retrieved within the configuration system for the superordinated control 4. By way of example, a character string 32 and address details 33, in the present case for example "00101" can be entered in this tab. By way of example, it is provided that the character string 32 is created manually by a user who knows the compilation of the components of the subordinated control 5, using a list (not shown). For this purpose, it can be provided that the user converts the stringing together of the individual components in the subordinated control 5, particularly the general valves 27 strung together with the safety module 22, and fail-safe valves 28 and result the zonal borders Z1 to Z4 using the list into the character string 32.

Furthermore, it is also provided by way of example that the user sets an address manually on the safety module 22, in particular by means of DIP switches 34 shown purely schematically on the safety module 22 in FIG. 1, and also enters the set address into the tab according to FIG. 3. By way of example, the switch positions "00101" are set on the DIP switches 34, shown in FIG. 1, of the safety module 22, which results in the addressing which can be seen in FIGS. 3 and 4 of precisely this safety module 22. This addressing is also used in the processing device 25 to check the configuration information which is described in detail in the following, because a comparison of the two character strings 31 and 32 initially requires an identity between the setting of address on the safety module 22 and the address information contained in at least one of the two character strings 31, 32.

Figure 4:
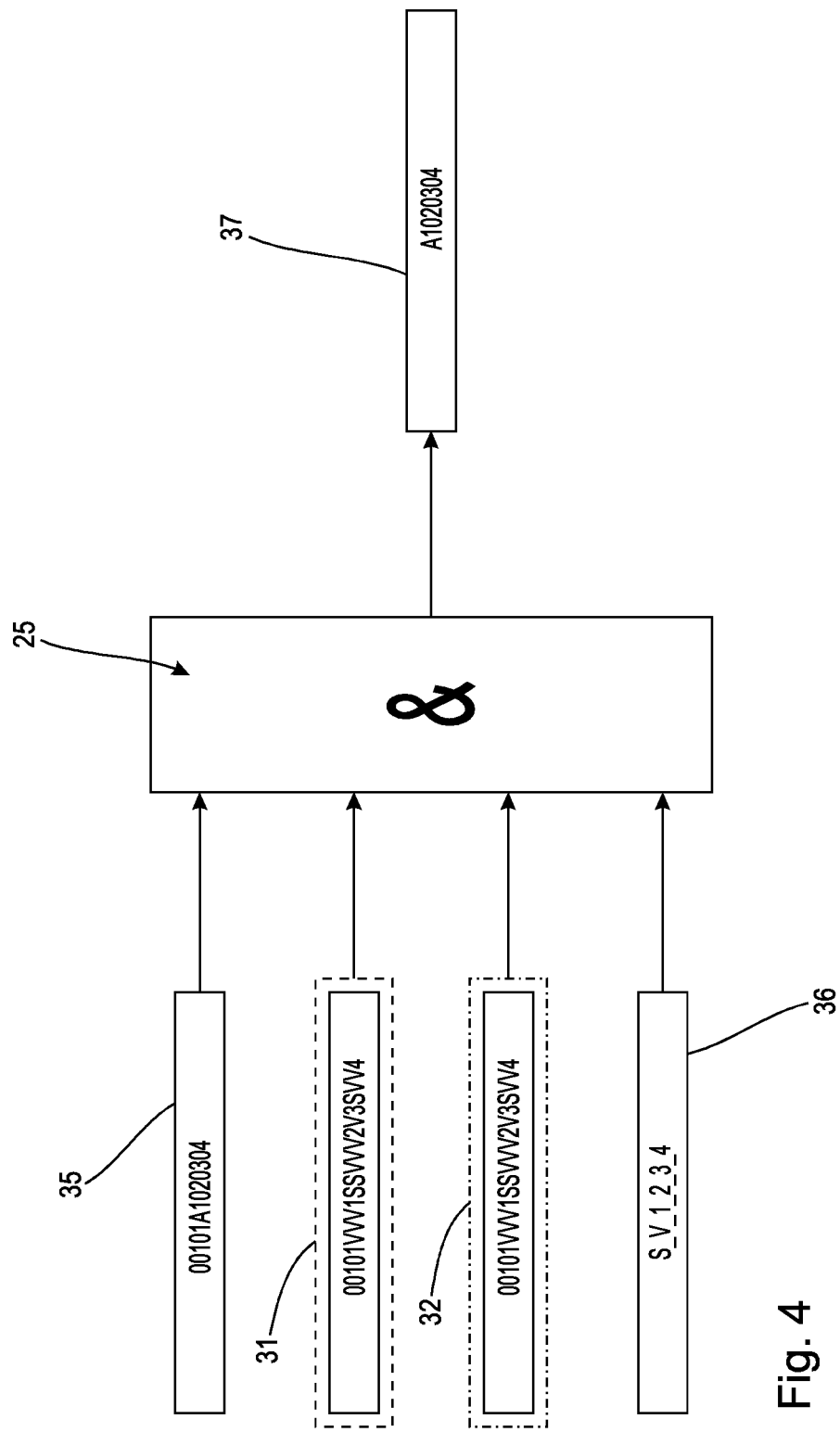
FIG. 4 shows a schematic flow chart for the provision of a safety-related output signal.

The processing device 25 of the safety module 22 is configured, inter alia, for implementing a procedure which is shown in FIG. 4 and in which the following steps are provided. In the processing device 25, in particular during a start phase during which output signals are not yet output to the downstream components, an AND-link takes place between the configuration created in the configuration system and the character string 31, determined automatically therefrom, for example by a corresponding software module of the processing device 25, and the character string 32 which has been created manually by the user and input manually into the graphic user interface. The identity is previously checked between the address setting in the safety module 22 and the address information contained in at least one of the two character strings 31, 32 to ensure that character string 31 and/or 32 is intended for the safety module 22. If the result of the check is positive, the result of the AND-link between the two character strings 31, 32 is stored in the processing device 25 of the safety module 22 and the subsequent, normal operation of the safety module 22 is held ready. If the result of the check is negative, i.e. if there is a discrepancy between the two character strings 31, 32 or if there is a difference between the address information contained in one of the character strings 31 and/or 32 from the address setting in the safety module 22, it is possible, for example, to provide an error message at the safety control 10 and/or at the superordinated control 4. In this case, the safety module 22 cannot commence normal operation and provide output signals.

During normal operation of the safety module 22, i.e. after a positive conclusion of the start phase, an AND-link of the result of the AND-link between the two character strings 31, 32 and the address information, contained therein, with the address setting in the safety module 22 takes place in the processing device 25 with a safety signal 35 which is provided by way of example by the safety control 10 and is transferred by the superordinated control 4 and by the associated bus system 6, the safety module 22 only providing an output signal at the connected components 27, 28, 29 when both AND-links are met.

Since the two character strings 31 and 32 are transferred, encoded in different ways, via the communication system on the safety module 22, which is symbolised by the different outline for the respective character string 31 and 32, and since the provision of output signals at the output interface 24 of the safety module 22 requires conformity between the two character strings 31, 32, the relevant information can be transmitted via the external bus system 6 and the internal communication system 14 without further safety requirements. The safety signal 35, provided by the safety control 10 is transmitted to the safety module via the bus system 6 within a safety-related bus protocol (for example PROFIsafe), and it comprises purely by way of example, in addition to the addressing directed at the safety module 22, a signal content which is formed, for example, as a character string with instructions for the respective zones Z1 to Z4.

Purely by way of example, the first 5 positions of the safety signal 35 contain the address, here, for example, "00101" of the safety module 22, for which the safety signal 35 is intended, although a different type of addressing could also be provided here, subject to the requirements of the bus communication protocol which is used. The further positions 6 to 13 denote the switching states for the respective zones Z1 to Z4. For example, it is provided that zone 29 according to FIG. 1, which comprises two fail-safe valves 28 and three general valves 27, is to remain in an active state, which is denoted by the identifier "A" in the safety signal 35. The other zones, inter alia also zone 30 are to assume the state "0". In state "0", the energy supply of the consumers is disconnected in the respective zone, for example.

According to the view of FIG. 4, the processing device 25 shown in FIG. 1 initially determines the character strings 31 and 32 which are provided in a different encoding. By way of example, it is provided that the first character string 31 is determined from the configuration of the consumers 27, 28 connected to the safety module 22, which configuration is provided by the configuration system. It is further provided by way of example that the second character string 32 is transmitted as parameters within a configuration, provided by the configuration system, for the safety module 22. In the exemplary case of FIG. 4, the processing device 25 establishes the identity of these two character strings 31 and 32.

It can be provided, purely by way of example, that the processing device 25 compares the received character strings 31 and 32 with the list of parameters 36 which contains the parameters "S, V, 1, 2, 3, 4 . . . " and which is stored in the memory device 26. This is significant if the consumers 27, 28 are controlled as bus users via an internal bus system, unlike the view of FIG. 1. Purely by way of example, the processing device 25 concludes that the two character strings 31 and 32 respectively only contain admissible parameters.

When the safety signal 35 is received, the processing device 25 can be further configured, for example, to carry out a check as to whether the safety signal 35 has the correct addressing (purely by way of example "00101") according to the position of the DIP switches 34, which is also the case, for example, in the model view of FIG. 4.

Accordingly, the safety module 22 can then forward a safety signal 37 to the output interface 24 and to the components strung together with the output interface, in particular the general valves 27 and the fail-safe valves 28. Here, the switching states for the respective zones Z1 to Z4, in particular for the zones provided with reference numerals 29 and 30, are prepared by the safety module 22 to achieve the respective group switching state and are converted into corresponding electrical supplies for the individual conductors of the multipole line 50.

What is claimed is:

1. A safety module for an automation system, comprising a communication interface which is configured for a signal-transmitting connection to a communication system, comprising an output interface which is configured for an electrical connection to consumers which can be attached downstream, and comprising a processing device which is connected to both interfaces and is configured for processing communication signals from the communication interface and for providing processing results as output signals at the output interface, wherein the processing device is configured such that a safety-related output signal is provided at the output interface if a safety signal, which is contained in a communication signal, is present, and if at least two data records which are respectively provided in a communication signal, are encoded differently and are directed at the processing device, conform with one another.

2. The safety module according to claim 1, wherein the processing device is configured such that the provision of the at least one safety-related output signal at the output interface requires a decoding of a first set of parameters from a first data record, a decoding of a second set of parameters from a second data record and a conformity between the two sets of parameters.

3. The safety module according to claim 2, wherein the processing device is configured such that the provision of the safety-related output signal at the output interface requires a conformity of the first and second set of parameters with component parameters which are stored in a memory device of the processing device.

4. The safety module according to claim 2, wherein the processing device is configured such that the provision of the at least one safety-related output signal at the output interface requires a decoding of address information from the first data record and/or the second data record as well as a conformity of this address information with address information of an addressing means associated with the processing device.

5. The safety module according to claim 4, wherein the processing device is configured such that the decoding of the address information from the first data record and/or the second data record is executed before the conformity of this address information with address information of an addressing means associated with the processing device is executed.

6. An automation system for the safety-related control of at least one safety module, comprising a superordinated control which comprises an interface of a communication system to which at least one subordinated control is connected, the subordinated control comprising a safety module as well as a plurality of consumers connected to the safety module via an output interface, and also with a safety control which is associated with the superordinated control and is configured to provide a safety signal at the safety module via the superordinated control, wherein the safety module is configured according to claim 1.

7. A method for operating a safety module in an automation system, the method comprising:
   transferring a first data record written according to a first encoding, from a superordinated control to a safety module;
   transferring a second data record written according to a second encoding, from the superordinated control and/or a safety control, associated with the superordinated control to the safety module;
   decoding and comparing the two data records in a processing device of the safety module;
   transferring a safety signal from the superordinated control to the safety module;
   checking address information contained in the first or second data record against address information imprinted on the safety module;
   processing the safety signal in the processing device into at least one safety-related output signal; and
   providing the at least one safety-related output signal from the safety module to an output interface, to which at least one consumer is attached, if the address information contained in one of the two data records conforms with address information imprinted on the safety module and with the two data records.

8. The method according to claim 7, wherein the processing device provides the safety-related output signal to the output interface if the first data record and the second data record conforms with component parameters which are stored in a storage device of the processing device.

9. The method according to claim 7, wherein the processing device provides the safety-related output signal to the output interface if address information from the first data record and/or the second data record has been decoded in the processing device and if this address information conforms with address information of an addressing means associated with the processing device.

10. The method according to claim 7, wherein the processing device provides the safety-related output signal at least one group of components which are connected to the output interface if the first data record and the second data record contain in a conforming manner at least one group of parameters which determines at least one zone-bordering group, and if the safety signal of the superordinated control is directed at the group of components.

11. An automation system for the safety-related control of at least one safety module, comprising a superordinated control which comprises an interface of a communication system to which at least one subordinated control is connected, the subordinated control comprising a safety module as well as a plurality of consumers connected to the safety module via an output interface, and also with a safety control which is associated with the superordinated control and is configured to provide a safety signal at the safety module via the superordinated control, wherein the safety module is configured to implement the method according to claim 7.

* * * * *